United States Patent [19]

Gordin

[11] 4,450,507

[45] May 22, 1984

[54] COMPOSITE PHOTOMETRIC METHOD

[75] Inventor: Myron K. Gordin, Oskaloosa, Iowa

[73] Assignee: Mycro-Group Company, Oskaloosa, Iowa

[21] Appl. No.: 418,451

[22] Filed: Sep. 15, 1982

[51] Int. Cl.³ .............................................. B60Q 1/00
[52] U.S. Cl. ...................................... 362/61; 362/66; 362/249; 362/250; 362/285; 362/427; 362/428; 362/431
[58] Field of Search .................... 362/61, 66, 249, 250, 362/285, 427, 428, 431

[56] References Cited

U.S. PATENT DOCUMENTS 4,220,981  9/1980  Koether .............................. 362/250

Primary Examiner—Stephen J. Lechert, Jr.
Attorney, Agent, or Firm—Zarley, McKee, Thomte, Voorhees & Sease

[57] ABSTRACT

A method of producing a composite beam of uniform light from a plurality of defined beam, high-intensity, luminaires mounted on a luminaire assembly, adapted for use with a mobile mounting pole. By determining the characteristics of the defined beam produced by each luminaire, the area to be lighted, and the placement and number of luminaires to be used, the individual luminaire fixtures can be aligned to form a composite photometric beam, meeting the predetermined lighting requirements. The luminaire assembly is adjustably designed as a composite unit for a mathematically derived model of light energy configuration required to illuminate various shaped and sized target areas, such as football fields, etc.

5 Claims, 9 Drawing Figures

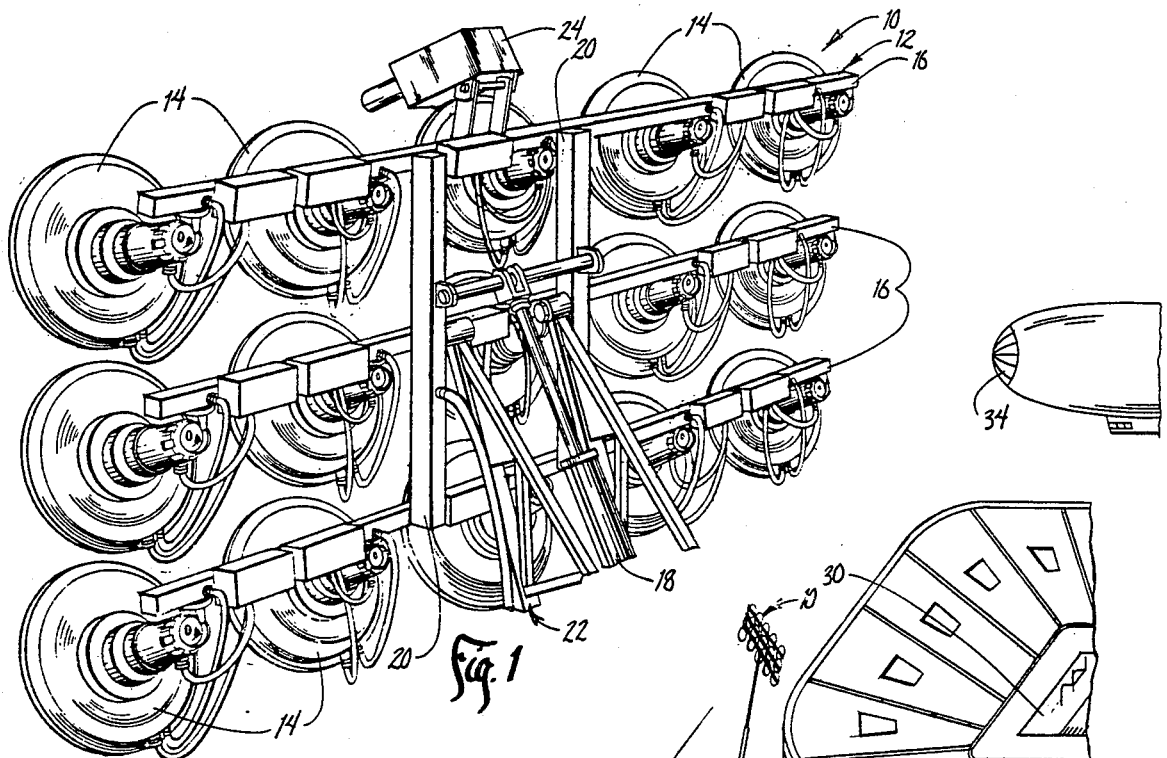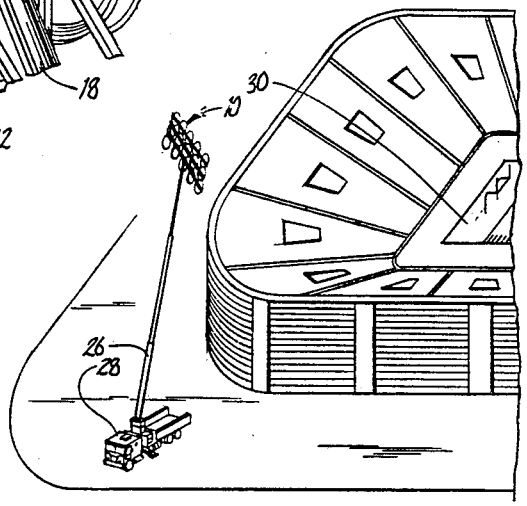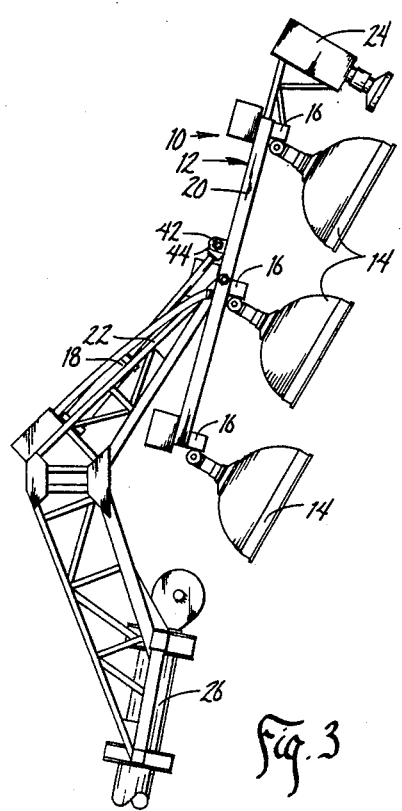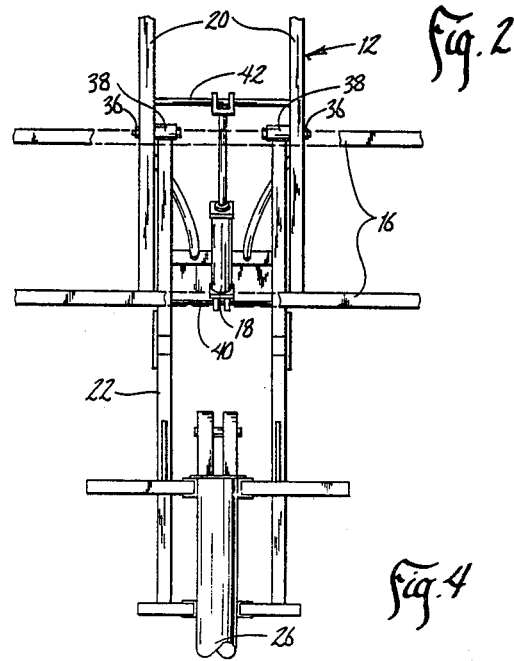

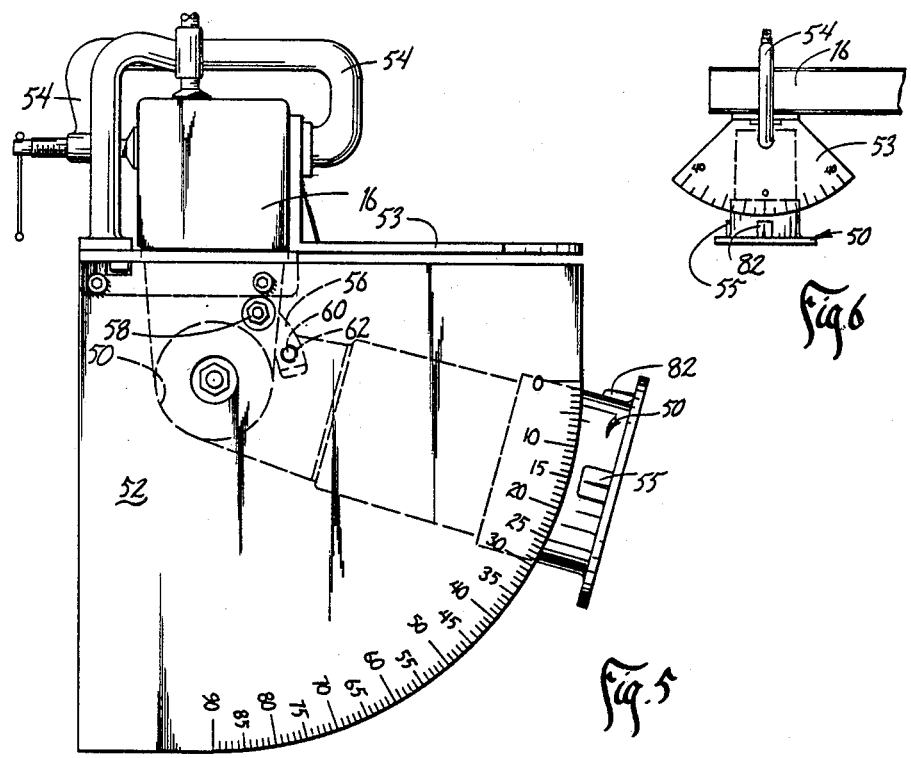
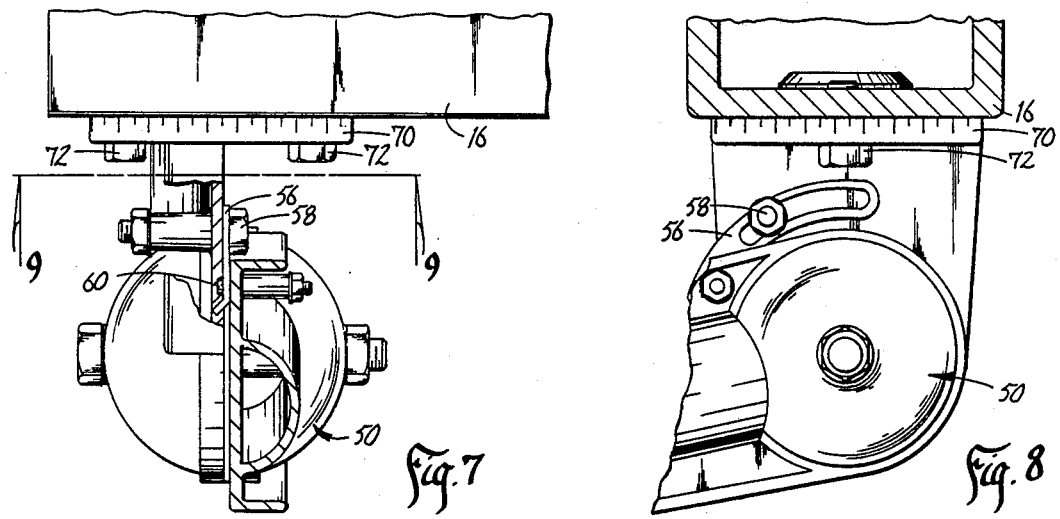
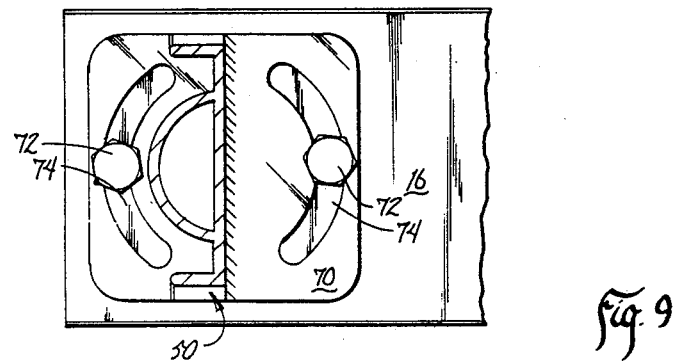

COMPOSITE PHOTOMETRIC METHOD

BACKGROUND OF THE INVENTION

1. Field of Invention.

This invention relates to the composite aiming of a plurality of individual luminaires, more particularly to the aligning of a plurality of defined beam, high-intensity luminaires to produce a composite beam of uniform light for use with mobile lighting systems.

2. Description of the Problems in Art.

Traditional methods of providing uniform light from a plurality of luminaries have relied on structures which are erected on-site, at which time individual luminaire fixtrues are aimed with respect to different points on the targeted area. Target areas as large as baseball diamonds or football fields require very substantial time and effort for post-erection, on-site aiming to produce the desired lighting effect. Literally each lamp of each lighting unit holding a plurality of luminaire fixtures must be individually aimed upon the selected target site (playing field) by utilizing at least one person at the top of the lighting unit support pole and one person at the target site.

Attempts have been made to reduce this on-site adjustment and aiming time by predetermining the lighting requirements of the targeted area, and then designing the make-up of the lighting fixtures to best solve the lighting requirements, taking into account efficiency, economy and limited interference with the events happening on the targeted area. Examples of this "pre-designing" are Neely, U.S. Pat. No. 4,141,056 a tennis court floodlighting system (and Neely Reissue No. 26,588). However, on-site manual aiming of the luminaire fixtures is still required, though the process is simplified by the pre-designing.

All the above mentioned problems are further amplified when applied to mobile lighting systems. With the proliferation of color TV, there is a real need for a mobile lighting system which is not only easily assembled, dissembled, and moved from location to location, but also produces a uniform, beam to promote reproduction. In one particular application of the invention, there is a desire to broadcast sports activities, such as football games, at night, so that the game may be more freely scheduled for television convenience rather than on the basis of whether or not the playing field has permanent lights. This, of course, cannot be done without lighting which is sufficient for quality transmission of the event by television. Significantly the expense of installing permanent lights when the number of nightime televised events will be very small, compared to the cost of the ighting, is not cost-efficient for many schools. Additionally, the aiming and maintenance problems discussed above, coupled with the initial high expense, render permanent lighting installations often impractical.

As earlier mentioned, nightime television broadcasting also presents the problem of scheduling flexibility. Many times a network may desire to show a game at night so it will not conflict with other scheduled events. Currently this cannot be done unless the schools involved have permanent lights. However, since nightime television lighting would be needed for only a handfull of games (usually only one) for each particular stadium in a year, permanent installation of lighting for such an occasional happening is not justified.

Therefore, there is a real need for mobile lighting systems which are efficient, economical, easily transportable, and can produce the strict defined lighting standards needed for television broadcasts.

Performance standards for lighting level are measured in foot candles (fc), the common measurement of light levels. The needed foot candles are determined by the sport being played, the size of the field, the shape of the stadium, its location, etc. The following are examples of standards used for different sports:

1. Baseball —recreational skill level; greater than 320 foot field radius 50 fc infield/30 fc outfield.
   University —100 fc infield/70 fc outfield.
   Major league —200 fc infield/150 fc outfield.
2. Football -University —100 fc.
   Professional —200 fc.

Another performance standard for the lighting systems is the maintenance of the minimum standard for uniformity of lighting throughout the playing area. This is important not only for television coverage, but also for the sport being played. The evenness of the lighting is called "uniformity" and expresses a ratio between the maximum and minimum foot candles on the area. Uniformity of light is just as important as absolute level of light. Objects such as baseballs will appear to change speeds as they pass from dark to light areas in a non-uniform light, thus making them difficult to follow.

The minimum standard for unifomity for most sporting events is three to one. This means that no spot on the field should be less than one-third of the brightest illumination of another spot on the field. Uniformity is as important on a 30 foot candle recreational softball field as it is on a major league ball field lighted to 200 foot candles, since the lack of it will have an adverse effect on player performance.

Uniformity is directly related to aiming of the lights, and again, becomes an amplified problem when dealing with mobile lighting.

Pre-aiming of a plurality of luminaires contained in one lighting unit, has been attempted for permanent lights. By determining and organizing the lighting properties of the individual luminaires and applying this to the targeted area, lighting units have been designed wherein the individual fixtures are preset to produce a cetain beam pattern. Hayakawa, U.S. Pat. No. 4,025,777, a clinical illumination apparatus, presets a plurality of luminaires to produce a pinpoint, high intensity light for use in medical applications. Cahill, U.S. Pat. No. 1,235,527, an illuminating system for baseball and other games, predesigns a light pattern for the illumination of a playing surface, based on a number of lighting units. Van Dusen, J., U.S. Pat. No. 3,660,650, utilizes a plurality of luminaires that are adjustable so that several pre-selected lighting patterns can be utilized.

However, none of these prior art attempts show or contemplate the factory aligning of a plurality of luminaire fixtrues with respect to one another as measured against a fixed cross-beam reference to present a composite, uniform photometric beam which can be used in combination with an adjustable mobile rigging to allow numerical adjustment of lighting quality and quantity to match predetermined computer derived models. Also, as a result of this invention, only one aiming of a single fixtrue is needed on-site to effectively aim the entire lighting unit. While some of the referenced patents do show a predetermined beam pattern formed from a number of luminaires, these patterns are not afjustable for different fields by simple movement of a mobile rigging unit and on-site aiming of a single luminaire for each unit assembly, resulting in the capability of lighting quality and quantity.

The prior art has not solved the problem of efficiently and economically designing and implementing lighting systems which can be pre-aligned, transported to site, used, then removed from the site to be transported to a different site and realigned by adjusting only a single luminaire to meet the defined lighting standards required for an entirely different field.

Finally, the prior art has not surrmounted the inevitable problem of inadvertent or accidental misalignment of a lighting unit.

If prior art lighting units are misaligned because of wind, shock, or other calamity, there is no easy method to re-aim the unit without re-aiming all luminaires. This is especially critical if the misalignment occurs during an athletic event which is in progress.

Therefore, it is an object of this invention to provide a method of aligning a composite photometric beam from a plurality of defined single beam high-intensity luminaires for use with a mobile lighting system.

A further object of this invention is to provide a method for the aligning of a composite photometric beam for different sized athletic field target areas and uses.

A further object of this invention is to provide a composite photometric partially prealigned beam wherein only one aiming point on the targeted athletic field area is needed for one luminaire to align the entire composite beam for all the luminaires of cross-beam assebly.

Another object of this invention is to provide a method wherein corrections in aiming can be made continuously and remotely while in use, and on-site.

A further object of this invention is to provide a method wherein a pre-aligned composite photometric beam can be intentionally moved to illuminate another object, then immediately re-aimed on the original target area, to again give the defined field lighting.

A still further object of this invention is to provide a method wherein the targeted area (i.e., a selected outdoor field) is analyzed to determine how many luminaires and composite photometric beams are to be used, and to determine the location of mounting poles, or other mounting structure, to provide a uniform target area lighting.

These and other objects of the invention will become apparent with reference to the accompanying specification, drawings and claims.

SUMMARY OF THE INVENTION

According to the method of this invention, a plurality of defined beam, high-intensity luminaires are mounted on a cross-arm assembly. The cross-arm assembly is adjustably mounted on the end of a mobile mounting structure, for convenience referred to herein as a "pole". The plurality of luminaires are pre-aligned, for example at the factory, to produce a composite photometric beam of uniform light. The cross-arm assembly is mounted to the mounting pole in such a manner that it can be adjustably tilted by remote control.

Aligning of the luminaires is accomplished by first determining the dimension characteristices of the field to be lighted. The number of mounting pole locations and individual luminaires on each cross-arm assembly are then determined. One then determines the light characteristics needed for the target area. For example, knowing that for good light beam efficiency for athletic fields an intensity brightness of light areas to dark should not vary any greater than three to one (lightest to darkest), one can determine the required intensity of light needed over the field area. Since one also knows the entire field characteristics of the individual luminaires, one can determine how each luminaire should be aligned with respect to the vertical and horizontal coordinates of the cross-arm or luminaire assembly unit.

The resulting aligned plurality of luminaire fixtures, will thus produce the desired uniform intensity in the target area. Using the adjustable cross-arm assembly's vertical and horizontal arms as fixed reference points, allows the whole lighting unit to be aimed on site by utilizing just one aiming point on the field, and adjusting a single luminaire to the field aiming point.

BRIEF DESCRIPTION OF THE DRAWINGS

FIG. 1 is a perspective view of the rear side of the cross-arm assembly of the mobile lighting unit.

FIG. 2 is a perspective schematic of the invention on-site at a football stadium.

FIG. 3 is a side elevation view of the lighting unit and upper boom.

FIG. 4 is a front view of the upper boom.

FIG. 5 is an elevated side view illustrating the vertical adjusting pre-aiming of a light fixture.

FIG. 6 is a front sectional view of the elbow joint of a single fixture.

FIG. 7 is a side view of the elbow joint of a single fixture.

FIG. 8 is a bottom sectional view taken along lines 8—8 of FIG. 6.

DETAILED DESCRIPTION OF THE PREFERRED EMBODIMENT

In accordance with the invention and with reference to the drawings, in particular FIG. 1, there is shown a mobile lighting array 10 including a lighting rack framework 12 holding a plurality of aligned luminaires 14 along the horizontal cross-bars 16 of framework 12. Framwork 12 is tiltable by means of remotely controllable hydraulic cylinder 18 which is connected to vertical support bars 20 at one end and boom jib 22 at the other. A video camera 24 is mounted upon framework 12 to facilitate remote aiming of the array 10.

By utilizing the parallel nature of horizontal crossbars 16, luminaires 14 can be factory aligned to produce a composite high intensity beam from the fifteen individual defined beam lamps 14.

With reference to FIG. 2, it can be seen how lighting array 10 is mounted upon extensible and collapsible boom 26 which is in turn 360° pivotal about its attachment point to V-shaped boom jib 22 is attached at its lower ends to the upper end of boom 26, as shown in FIG. 3. The upper end of V-shaped boom jib 22 is attached to vertical support bars 20 by hinge bolts 36 which extend transversely through vertical support bars 20 and horizontal tubes 38, which are rigidly attached to the ends of boom jib 22. Hydraulic cylinder 18 attaches at its lower end to cross member 40 which extends between opposite sides of boom jib 22, and attaches at its upper end to pivot bar 42. Pivot bar 42 is attached at opposite ends to ears 44 of vertical support bars 20. The exact structure of mobile lighting array 10, boom jib 22 and boom 26 are set out more specifically in the concurrently filed, commonly assigned application, Ser. No. 418,452, entitled MOBILE LIGHTING FIX- TURE, METHOD AND BOOM, which is hereby incorporated by reference.

FIG. 5 illustrates the structure for aligning the vertical attitude of lighting fixture 50 of luminaires 14 with respect to a horizontal crossbar 16. A horizontal protractor 52 is mounted upon horizontal crossbar 16 by means of clamp 54 so that its degree markings are oriented to present a scale by which the vertical attitude of fixture 50 may be positioned according to specifications. Vertical reference marker 55 on lighting fixture 50 is used as a reference point. A slotted arm 56 (shown in full in FIG. 8) contains bolt 58 which can be tightened or loosened to re-orient the vertical attitude of fixture 50. Pin 60 fits into aperture 62 at the end of slotted arm 56 so that the fixture 50 can be "snapped" out of alignment and then subsequently "snapped" back into alignment.

FIGS. 5, 6, 7 and 8 depict the structure by which the horizontal attitude of each individual fixture 50 is produced. Base flange 70 of fixture 50 attaches to the underside of horizontal crossbar 16 by two bolts 72, as seen in FIG. 8. Slots 74 allow fixture 50 to be turned through a greater than 90° range.

A horizontal protractor 53 is positioned upon horizontal bar 16 by clamp 54 so that it is perpendicularly aligned with bar 16. By aligning the 0° marking on horizontal protractor 53 with the horizontal reference mark 82, the fixture 50 is ready to be aligned with its predetermined horizontal angular orientation. Once the fixture 50 is aligned in accordance with the horizontal predetermined angle, bolts 72 in slot 74 are tightened to secure fixture 50 in the pre-aimed position.

The above described structure and method is utilized to produce the required luminaire adjustments to give the composite beam of uniform light from a plurality of defined beam, high-intensity luminaires, in accordance with the invention, as follows. The characteristics of the target area, such as area size and possible locations for trucks 28 carrying boom 26 and mobile lighting arrays 10 are determined. The needed intensity for the particular activity taking place on the targeted area is also determined. This information is used to produce a computer derived model of light quality and quantity for the field. The lighting array 10 locations are then selected as are the number of individual luminaires 14 to be mounted upon each array 10.

With this preliminary information, combined with knowledge of the characteristics of the narrow beam produced by each individual luminaire 14, the exact angular orientation of each luminaire 14 with respect to lighting rack framework 12 can be ascertained. Using these determinations, along with vertical protractor 52 and horizontal protractor 53, each luminaire 14 can be aligned to produce a composite photometric beam for each lighting array 10 to satisfy the predetermined lighting requirements for the given target area (field).

Upon aligning each luminaire 14, permanent indicia are marked upon the structure so that the individual luminaires 14 can be moved to a more convenient transport mode. The lighting arrays 10 are then moved to the targeted location, erected upon boom 26 of trucks 28 at the pre-determined locations, surrounding the target area, and the individual luminaires are snapped back into their marked, aligned position utilizing the permanent indicia markings. The "factory alignment" produces the composite beam which allows the entire lighting array 10 to be accurately aimed upon the target area by using only one selected aiming point. The aiming point is the point on the target area wherein one of the individual luminaires 14 is centrally focused. Therefore, by choosing the aiming point associated with any luminaire 14 in a lighting array 10, the whole array 10 can be aimed.

Video camera 24 can be mounted and aimed on lighting rack framework 12 in such a manner that by lining up the crosshairs on the video camera 24 with a predetermined spot (aiming point) on the target area, the whole lighting array 10 can be aimed. This feature allows continual and constant updating of the aiming of the composite beam formed from lighting array 10 and also allows lighting array 10 to be intentionally moved from its aimed point, or tilted to light another area and then brought back into the pre-aimed position at the original target area, simply by remotely viewing the aiming point through the eyes of the video camera 24.

This feature of one point aiming of the entire lighting array 10 solves the problem of inadvertent misalignment and allows movement to illuminate other objects of interest followed by easy re-alignment. An example of intentional misalignment would be the remote tilting of the lighting array 10 to illuminate the Goodyear ® blimp 34 as it passes by football stadium 32.

The method of pre-aiming individual luminaires 14 to produce a composite photometric beam from lighting array 10 is further illustrated in the following example.

EXAMPLE

A football field is to be illuminated for a nationally televised night fooball game. As earlier discussed, the minimum standard for uniformity of intensity is the ratio three to one, meaning that no spot on the field should be less than one-third of the brightest illumination of another spot on the field.

The individual luminaires selected were NEMA (National Electrical Manufacturers Association) class 2 lamps having a power rating of 2,000 watts and an initial lumens lighting level of 200,000. According to the physical characteristics of the actual stadium to be lighted in this example, it was decided that six mobile lighting arrays 10 were to be used, each having thirty luminaires 14 mounted upon them.

Using this preliminary information, a computer two dimensional map of the football field is derived utilizing X and Y coordinates to designate specific positions on the field and the positions of trucks 28 carrying booms 26 located around the stadium 32. The schematic is as follows:

| Y coordinates | Pole —135,360 | | | | | | | | | | | |
|---|---|---|---|---|---|---|---|---|---|---|---|---|
| | | | | | | Pole 220,340 | | | | | | |
| 70.00 | 61.3 | 77.0 | 84.5 | 90.4 | 107. | 117. | 124. | 116. | 101. | 83.6 | 69.5 | 49.5 |
| 50.00 | 97.1 | 95.0 | 105. | 109. | 119. | 131. | 136. | 130. | 111. | 96.9 | 79.7 | 54.7 |
| 30.00 | 107. | 101. | 117. | 123. | 129. | 138. | 140. | 133. | 124. | 105. | 83.0 | 58.1 |
| 10.00 | 112. | 110. | 125. | 123. | 130. | 137. | 141. | 137. | 124. | 102. | 80.0 | 55.3 |
| −10.00 | 124. | 119. | 136. | 134. | 135. | 143. | 144. | 136. | 122. | 101. | 78.6 | 55.8 |
| −30.00 | 126. | 129. | 143. | 138. | 140. | 148. | 141. | 140. | 125. | 105. | 83.2 | 62.2 |
| −50.00 | 94.9 | 120. | 131. | 130. | 141. | 147. | 148. | 141. | 122. | 99.9 | 81.5 | 66.1 |

| -continued | | | | | | | | | | | |
|---|---|---|---|---|---|---|---|---|---|---|---|
| −70.00 | 78.5 | 95.1 | 111. | 112. | 124. | 136. | 138. | 129. | 110. | 99.0 | 76.4 | 57.7 |

X Coordinates Pole −260, −104
−165.00 −105.00 −45.00 15.00 75.00 135.00
−135.00 075.00 −15.00 45.00 105.00 165.00
Pole −105, −350  Pole 15, −370  Pole 135, −350

The X and Y coordinates define the dimensions of the field with the coordinates (0, 0) being approximately the center of the field, coordinates (−165, 70) being approximately the upper left corner of the field, and (165, −70) being approximately the lower right hand corner of the field. The positions of the trucks 28 are designated by "Pole 31 135, 360" and so on. The numbers located on the field itself represent location of the 96 aiming points and the computer derived intensity in foot candles for each of those aiming points.

From the above requirements specifications, the following information is ascertained. The number of luminaires to be used is 180; the number of target points on the field are 96; the average intensity in foot candles across the field in 111.194; the maximum intensity in foot candles is 148.372; the minimum intensity in foot candles is 49.548; the ratio of the average intensity to minimum intensity is 2.244; and the uniformity of intensity ratio is 2.994.

The computer, knowing the above input information, then determines the exact aiming points for the individual luminaires 14 to create composite beams for each lighting array 10 to meet intensity specifications outlined above. An example of the aiming points for one lighting array 10 would be those associated with the point marked pole −105, −350. By knowing that this lighting array 10 will be held 165 feet in the air, the following X and Y coordinates on the schematic map are determined to be the desired aiming points for the luminaires 14:

| | | |
|---|---|---|
| −150, 50; | −150, −40; | −125, 50; |
| −130, 40; | −100, 50; | −110, −140; |
| −75, 50 | −90, −40; | −50, 50; |
| −70, 40; | −25, 50; | −50, 40. |

Knowing the exact aiming points for each luminaire 14, along with the height the lighting array will be raised above the field, the exact angular horizontal and vertical attitude of each fixture can be selected. Thus, the thirty luminaires 14 for the lighting array designated as pole −105, −350 are to be pre-aimed by utilizing protractors 52 and 53 in both the horizontal and vertical planes as follows. For each respective aiming point listed above, the number of luminaires set out in the left most column of the chart below, should be adjusted as follows:

| | | | Horizontal and Vertical Aiming Angles | | | | |
|---|---|---|---|---|---|---|---|
| # | X(POL) | Y(POL) | Z(POL) | X(AP) | Y(AP) | HORIZ. | VERT. |
| 3 | −105.0 | −350.0 | 165.0 | 90.0 | 50.0 | 26.0 | 20.3 |
| 2 | −105.0 | −350.0 | 165.0 | 90.0 | −40.0 | 32.2 | 24.3 |
| 3 | −105.0 | −350.0 | 165.0 | 105.0 | 50.0 | 27.7 | 20.1 |
| 2 | −105.0 | −350.0 | 165.0 | 105.0 | −40.0 | 34.1 | 23.8 |
| 3 | −105.0 | −350.0 | 165.0 | 120.0 | 50.0 | 29.4 | 19.8 |
| 2 | −105.0 | −350.0 | 165.0 | 120.0 | −40.0 | 36.0 | 23.3 |
| 3 | −105.0 | −350.0 | 165.0 | 135.0 | 50.0 | 31.0 | 19.5 |
| 2 | −105.0 | −350.0 | 165.0 | 30.0 | −40.0 | 23.5 | 26.0 |
| 3 | −105.0 | −350.0 | 165.0 | 150.0 | 50.0 | 32.5 | 19.2 |
| 2 | −105.0 | −350.0 | 165.0 | 50.0 | −40.0 | 26.6 | 23.5 |
| 3 | −105.0 | −350.0 | 165.0 | 165.0 | 50.0 | 34.0 | 18.9 |
| 2 | −105.0 | −350.0 | 165.0 | 70.0 | −40.0 | 29.1 | 24.9 |

Thus, the above table directs the factory pre-aimers to tilt three luminaires 14 of the array to be placed in the position −105, −350, 26° to the right and 20.3° vertically downward with respect to horizontal crossbar 16 and vertical support bars 20, so that they will correspond with aiming point (90, 50). By following this procedure with all six lighting arrays 10, six composite photometric beams will be formed which will fulfill the uniform lighting requirements of the football field for a color televised nightime football game.

Thus, it can be seen the invention meets at least all of its stated objectives. It is to be understood that changes and modifications can be made in the method while staying within the boundaries of the invention.

I claim:

1. A method of producing a composite beam of uniform light from a plurality of luminaires, each having defined beams, and each mounted on a luminaire assembly adapted for use with a mobile mounting structure, said method comprising:

determining the field size and description, the number of pole locations, and the fixture configuration for each pole;

ascertaining the required light intensity needed over said field to provide the pre-selected, defined illumination model;

ascertaining the individual beam characteristics of the defined single beam projected by each fixture of said total fixture configuration;

determining the horizintal and vertical coordinates of each such fixture relative to the luminaire cross arm assembly upon which it is mounted;

aligning each of said individual fixtures of said total fixture configuration in accordance with the predetermined horizontal and vertical coordinates such that when lit, they combine to form a composite photometric beam; and moving said mobile luminaire assemnly to said field and placing it in location, and aligning said mobile cross arm assebmly by aiming one of said fixtures to a preselected aiming point, and thereafter locking said cross-arm assembly to said pre-aimed position.

2. The method of claim 1 wherein said pre-aiming of each of said fixtures is by:
referencing a horizontal angular measuring device to said crossarm assembly;
aligning said fixtures with said device in accordance with the pre-determined horizontal and vertical coordinates.

3. The method of claim 1 wherein said pre-aiming of each of said fixtures is by:
referencing a vertical angular measuring device to said crossarm assebly;
aligning said fixtures with said vertical angular measuring device in accordance with the predetermined vertical coordinates.

4. The method of claim 1 wherein moving said mobile crossarm assembly and placing it in location is by:
transporting a mobile platform to the predetermined location at said field;
raising said crossarm assembly to the predetermined height from said mobile platform.

5. The method of claim 1 wherein said aligning of said mobile crossarm by any one of said fixtures to a preselected aiming point is by:
mounting a video camera upon said crossarm assembly;
pre-aiming said video camera to a predetermined horizontal and vertical coordinates relative to the crossarm assembly upon which it is mounted;
moving said mobile crossarm assebly to said field and placing it in location;
aligning said mobile crossarm by remotely aiming said video camera to a preselected aiming point on said field.

* * * * *